United States Patent [19]
Schlegel

[11] Patent Number: 6,065,549
[45] Date of Patent: May 23, 2000

[54] LIMITED SWAY CAM

[75] Inventor: Daniel K. Schlegel, Salem, Wis.

[73] Assignee: Case Corporation, Racine, Wis.

[21] Appl. No.: 09/140,214

[22] Filed: Aug. 26, 1998

[51] Int. Cl.[7] .................................................. A01B 59/043
[52] U.S. Cl. ............................................................. 172/450
[58] Field of Search ................................... 172/450, 439, 172/415, 677

[56] References Cited

U.S. PATENT DOCUMENTS

| | | | |
|---|---|---|---|
| 657,494 | 9/1900 | Marick | 172/415 X |
| 2,987,126 | 6/1961 | Horney | 172/450 |
| 3,721,302 | 3/1973 | Buchmuller et al. | 172/450 |
| 3,888,316 | 6/1975 | Azzarello et al. | 172/450 |
| 3,910,355 | 10/1975 | Elfes et al. | 172/450 |
| 4,265,464 | 5/1981 | Lange | 172/450 |
| 4,268,057 | 5/1981 | Engelmann et al. | 172/450 X |
| 4,470,613 | 9/1984 | Sykes | 172/450 X |
| 4,601,486 | 7/1986 | Marcq | 172/450 X |
| 4,640,522 | 2/1987 | Teich | 172/450 X |

*Primary Examiner*—Christopher J. Novosad
*Attorney, Agent, or Firm*—Foley & Lardner

[57] ABSTRACT

A work vehicle for carrying an implement and for tranversing both on-road and off-road surfaces is disclosed. The vehicle has a longitudinal centerline, a left side and a right side. The vehicle includes a frame, a hitch mounted upon the frame for coupling an implement to the vehicle, a moveable ground support device disposed at each side of the vehicle and associated with the frame, and an adjusting apparatus. The hitch allows lateral movement, or sway, with respect to the frame. The moveable ground support devices elevate and support the frame with respect to the surface and allow traversing of the frame with respect to the surface. The adjusting apparatus includes a cam follower coupled to the hitch and a cam coupled to the frame. The cam has a full sway surface, at least one partial sway surface and a substantially no sway surface. The cam moves in a plane substantially parallel to the longitudinal centerline of the vehicle between a full sway position in which the full sway surface faces the cam follower, a partial sway position in which the at least one partial sway surface faces the cam follower and a no sway position in which the no sway surface faces the cam.

20 Claims, 3 Drawing Sheets

LIMITED SWAY CAM

FIELD OF THE INVENTION

The present invention relates to work vehicles, such as agricultural vehicles, having hitches for the carrying of implements. More particularly, it relates to limiting of lateral movement, or sway, of an implement upon a work vehicle and thereby preventing contact of the hitch or implement with the vehicle's tires or crawler treads.

BACKGROUND OF THE INVENTION

Agricultural vehicles have long been provided with hitches for coupling various implements to the vehicle, whereby the implement may be moved through a field by a vehicle and an operation performed upon the soil of the field or a crop growing thereon.

A type of hitch in frequent use is the three-point hitch, adjustable in the height at which it carries an implement so that the depth of engagement of an implement with the soil may be adjusted and so that the implement may be raised up out of engagement with the soil when the vehicle is turning around at the end of a row, or when the vehicle is transporting the implement to or from the field, often over a paved road.

Since it is difficult to align a vehicle to an implement when backing up the vehicle to the implement for the purpose of mounting the implement upon the hitch, hitches are necessarily designed with a capability of lateral movement, or "sway", so that they can be swung to either side to complete the alignment when the vehicle has been drawn sufficiently near the implement to couple it. To make the aligning and coupling process as easy as possible, the amount of lateral movement available, or width of sway, may be unimpeded and restricted only by the geometries of the vehicle, the implement, and the hitch itself.

Conversely, when the hitch is raised by the vehicle for carrying the implement to or from the field or for making a sharp turn at the end of a row, it is desirable for there to be no sway (i.e., for the hitch and therefore the implement to be held against lateral movement) so that normal movement of the vehicle in motion will not allow the implement to randomly swing to and fro, swinging into objects otherwise cleared by the vehicle and swinging into a rear wheel, or crawler tread, of the vehicle itself. For this reason, hitches often include sway limiting devices which can be adjusted to "full sway" or "no sway" positions, although such adjustments sometimes require the use of tools such as wrenches and therefore necessitate that the vehicle operator keep tools of the proper sizes at hand.

It is desirable for an implement hitch to have another position of sway adjustment, a "partial sway" position which provides sufficient width of sway to allow a tilling implement such as a plow to briefly move aside without overstressing the hitch or pulling laterally on the rear of the vehicle when encountering an obstacle such as a large stone, or to allow a soil surface engaging implement to follow contours of the soil surface without imposing undue loads upon the vehicle or its hitch. Such position adjustments are generally configured to limit sway to a narrow enough width that the hitch or the implement cannot swing laterally far enough to come into contact with the rear wheels or treads of the vehicle.

Many wheeled vehicles are provided with an adjustable rear tread width; i.e., the rear wheels may be moved to positions nearer a longitudinal centerline of the vehicle and the vehicle thereby provided a narrower rear tread width desirable for particular operations and particular crop row spacings. The wheels are otherwise generally adjusted to outermore positions for best stability and handling of the vehicle. When they are in their innermore positions for a narrower tread width, however, the normal "partial sway" position of sway adjustment may not sufficiently limit the width of sway, and the implement or hitch may strike one or both of the tires mounted upon the wheels. This may cause damage to the tires, the hitch, and/or the implement.

SUMMARY OF THE INVENTION

The present invention relates to a work vehicle for carrying an implement and for traversing both on-road and off-road surfaces, the vehicle comprising a frame; a hitch mounted upon the frame for the coupling of an implement to the vehicle, the hitch configured to allow lateral movement, or sway, with respect to the frame; moveable ground support devices such as wheels or crawler treads disposed at each side of the vehicle and associated with the frame for elevating and supporting the frame with respect to the surface and for allowing traversing of the frame with respect to the surface, and an adjusting apparatus for adjustably limiting the width of the sway and including a full-sway position, at least one partial-sway position, and a substantially no-sway position.

The present invention further relates to a hitch mounted upon a frame of a work vehicle for the coupling of an implement to the vehicle, the vehicle configured for traversing both on-road and off-road surfaces and having a left side and a right side, the vehicle including at least one moveable ground support device located on each side of the vehicle and located in the region of the hitch, the ground support devices elevating and supporting the frame with respect to the surface and allowing traversing of the frame with respect to the surface, the hitch configured to allow lateral movement, or sway, of at least a portion of the hitch with respect to the frame, the hitch including an adjusting apparatus for adjustably limiting the width of the sway and including a full-sway position, at least one partial-sway position, and a substantially no-sway position.

DESCRIPTION OF THE DRAWINGS

A full understanding of the invention may be gained from the Drawings taken together with the Detailed Description below. In the Drawings and the Detailed Description, like reference numerals refer to like parts.

DETAILED DESCRIPTION OF THE PREFERRED EMBODIMENT

Figure 1:
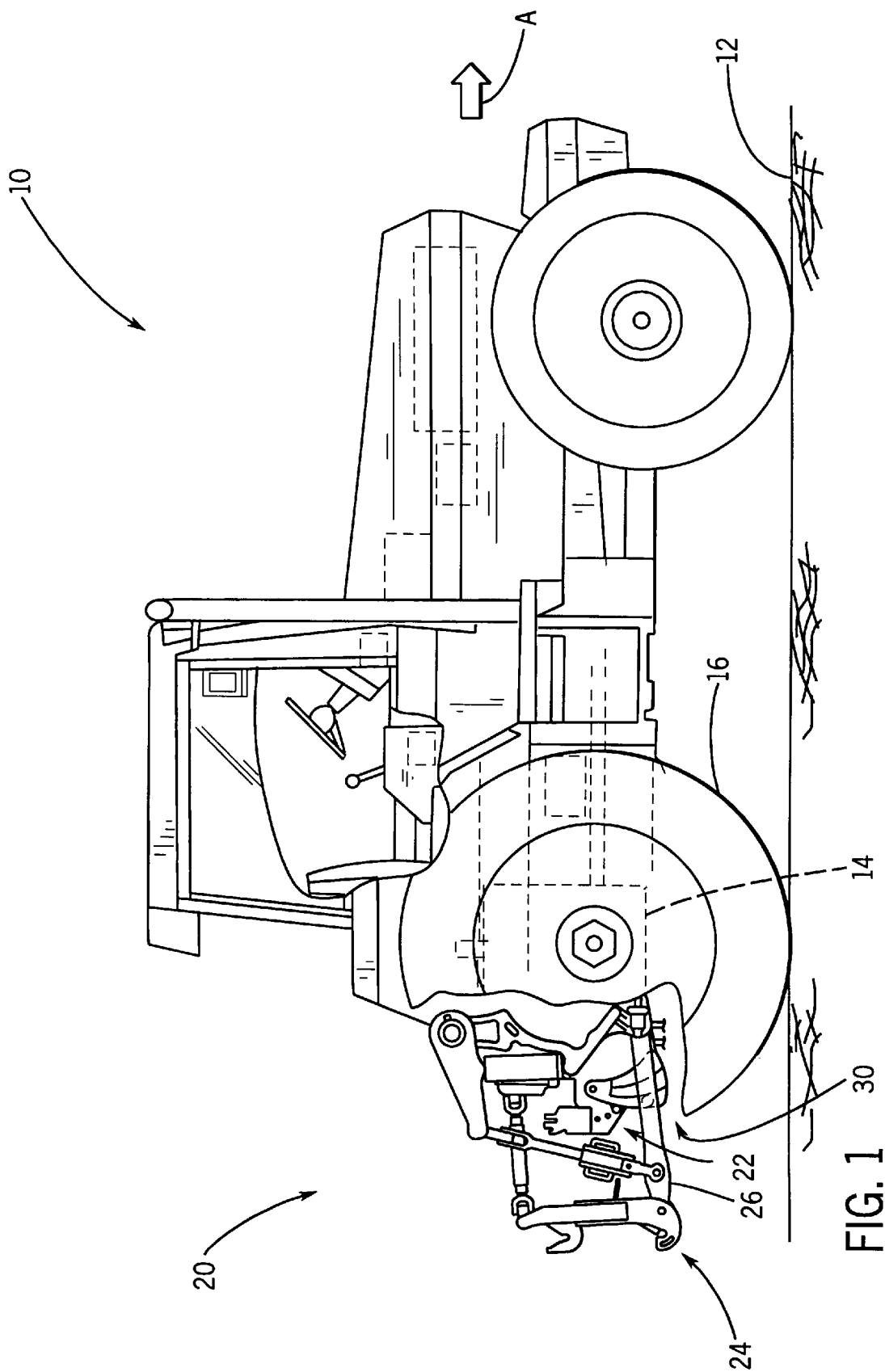
FIG. 1 is a right-side fragmentary elevation view of a vehicle having a hitch.

Referring to FIG. 1, a work vehicle 10 (e.g., an agricultural tractor) includes a frame 14 to which is mounted a hitch 20 for coupling an implement to vehicle 10. Vehicle 10 may move the implement across a surface 12 such as a field or a road leading to or from a field. Hitch 20 is an apparatus of a type known as a three-point hitch, configured as a four-bar linkage disposed for generally vertical movement. Vehicle 10 has a right side and a left side, with respect to the direction of forward motion indicated by arrow "A" in FIG. 1. Vehicle 10 further includes right-side and left-side moving devices 16 and (in FIG. 5) 18, respectively, for supporting and elevating frame 14 upon surface 12 and for propelling vehicle 10 across surface 12. Moving devices 16 and 18 are illustrated as wheels, but may instead be another type of moving device; e.g., crawler treads.

Hitch 20 includes a first portion 22 which is affixed to frame 14 and substantially immovable with respect to it, and a second portion 24 which is movable with respect to first portion 22 and hence to frame 14 and surface 12. The path of motion of second portion 24 with respect to first portion 22 is generally vertical, allowing an implement coupled to hitch 20 to be lowered to or into the soil for a farming operation to be performed and to be elevated above surface 12 of the soil for facilitating sharp turns, such as at the headland of a field, and for transporting the implement between fields and the farmstead.

Hitch 20 includes a right-side draft arm 26 and a left-side draft arm 28 (shown in FIG. 5), left-side draft arm 28 being a mirror image of right-side draft arm 26. Hitch 20 further includes a right-side adjusting apparatus 30, discussed in greater detail below, for adjusting the right-side limit of lateral movement, or "sway", which is allowed second portion 24 of hitch 20. Hitch 20 also includes a left-side adjusting apparatus which is a mirror image of right-side adjusting apparatus 30 and is not shown, it being understood that the left side of hitch 20 is generally a mirror image of the right side of hitch 20 and that a description of structure and/or function of either side applies equally to the other side. A reference below to "adjusting apparatus", "draft arm", "cam plate", "cam follower", etc. is therefore to be understood to refer equally to either the right-side part shown in the FIG's. or to the corresponding mirror-image left-side part.

Second portion 24 is provided another degree of freedom with respect to first portion 22, in that it may sway to either side with respect to first portion 22 in order to facilitate aligning of hitch 20 to an implement when preparing to mount the implement upon hitch 20, as well as to alleviate forces applied to hitch 20 and to vehicle 10 when the implement encounters an obstacle such as a large stone or an asymmetrical load such as will be caused by an obliquely angled furrow.

Figure 2:
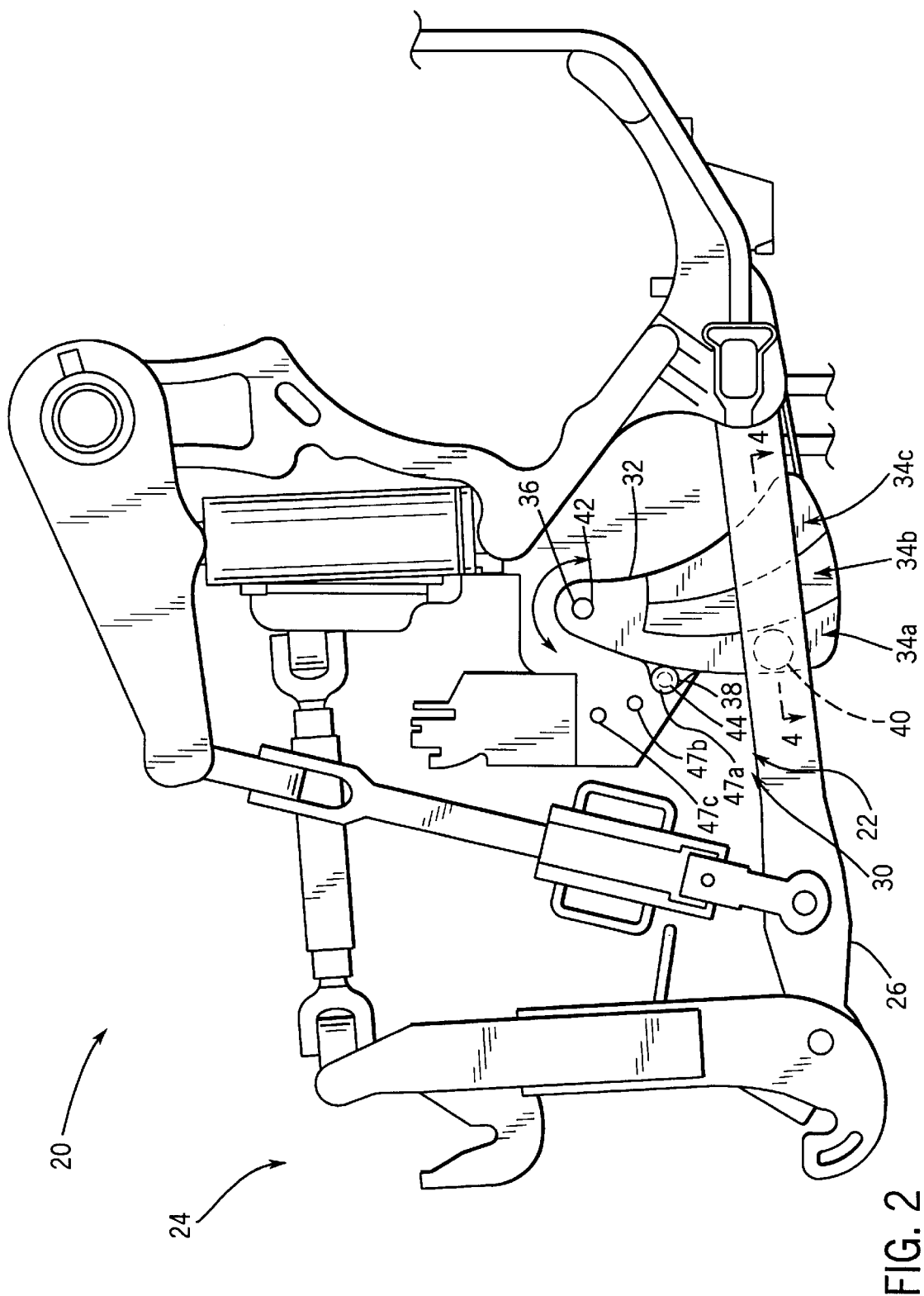
FIG. 2 is an enlarged right-side fragmentary elevation of the hitch shown in FIG. 1.

Referring now to FIG. 2, the configuring of hitch 20 and of adjusting apparatus 30 may be seen more clearly. A cam plate 32 is shown pivotally mounted upon first portion 22 of hitch 20, and a cam follower 40 is shown in facing and adjacent relationship and mounted upon draft arm 26. Cam plate 32 is pivotally mounted to first portion 22 by a first shaft 42, which may be a device such as a bolt or a pin passing through a first aperture 36 in cam plate 32 and secured to first portion 22. The diameter of first aperture 36 is made slightly larger than is the diameter of first shaft 42, so that cam plate 32 may be easily pivoted about first shaft 42 without the use of a tool. Cam plate 32 is retained in the pivoted position by a second shaft 44, which similarly passes through a slightly oversized second aperture 38 in cam plate 32 and is secured to first portion 22 of hitch 20 in one of a series of third apertures 47a, 47b or 47c, each third aperture corresponding to a particular position of cam plate 32.

Figure 3:
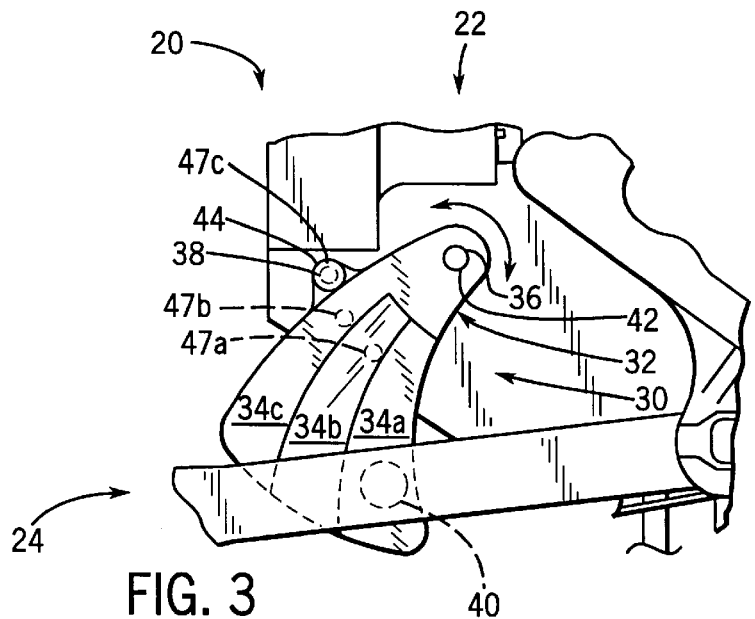
FIG. 3 is an enlarged right-side fragmentary elevation of a hitch sway limit adjusting apparatus shown in FIG. 2.
Figure 4:
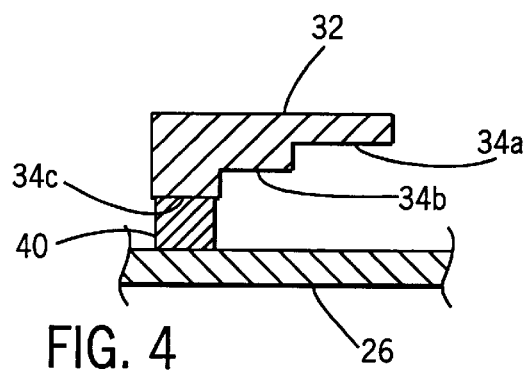
FIG. 4 is a fragmentary sectional plan view taken along the line marked 4—4 within FIG. 2 and showing a right-side draft arm of the hitch and the adjusting apparatus cam plate and cam follower.

Cam plate 32 includes, on its side facing cam follower 40, three surfaces 34a, 34b, 34c which may be of stepped relationship whereby the thickness of cam plate 32 differs under each of the three surfaces, as may be seen in FIG. 4. Also shown in FIG. 4 is an abutting engagement of cam follower 40 with respect to surface 34c; rotation of cam plate 32 to a new position (e.g., from the position associated with third aperture 47a in FIG. 2 to the position associated with third aperture 47c as is shown in FIG. 3) will change the engagement of cam follower 40 from surface 34a as shown in FIG. 4 to surface 34c. Similarly, engagement of cam follower 40 with surface 34b of cam plate 32 is associated with engagement of second shaft 44 with third aperture 47b.

FIG. 3 shows cam plate 32 pivoted to a position other than that shown in FIG. 2, to show the relationship of parts in the new position and generally the use of adjusting apparatus 30. An adjusting of sway width using adjusting apparatus 30 comprises a pivoting of cam plate 32 about first shaft 42 to engagement of a second aperture 45 with a new third aperture 47a, 47b, or 47c and securing the new position using second shaft 44, thereby engaging a different surface 34a, 34b, 34c of cam plate 32 with cam follower 40.

FIG. 4 shows the relationships of draft arm 26, cam follower 40, and surfaces 34a, 34b, 34c of cam plate 32. It may be appreciated that draft arms 26, 28 are spaced apart from first portion 22 of hitch 20, and that the resulting gaps between draft arms 26, 28 and first portion 22 allow sway of second portion 24. Adjusting apparatus 30 uses cam plates 32 to adjustably fill the gaps in a shimming manner, and the sway width allowed in a particular position of adjustment is therefore associated with which surface 34a, 34b, or 34c, and the corresponding thickness of cam plate 32, is selected for engagement with cam follower 40.

Figure 5:
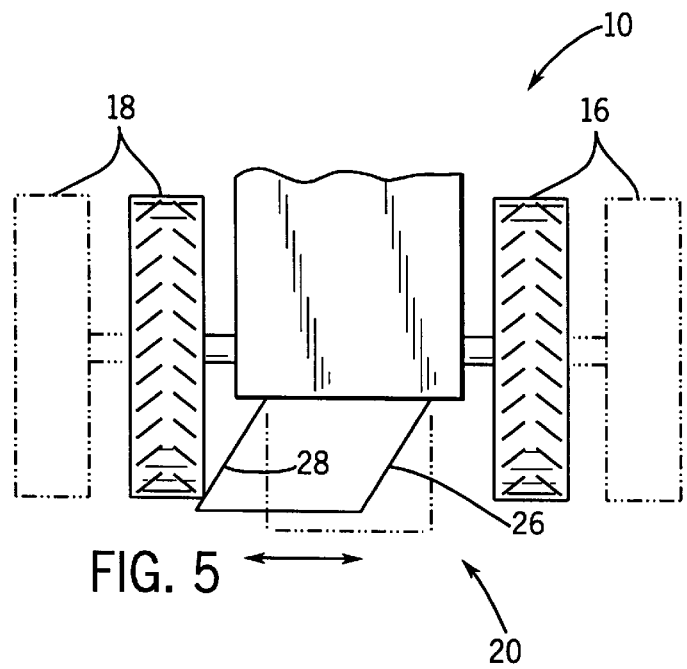
FIG. 5 is a fragmentary plan view taken along the line marked 5—5 within FIG. 1, and showing the work vehicle with hitch, the hitch shown schematically.

Referring to FIG. 5, a condition of operation is shown wherein sway limit adjustments are too wide and allow left-side draft arm 28 to interfere with the tire of left side wheel 18. This condition may damage the tire of wheel 18, hitch 20, or vehicle 10. Wheels 16 and 18 have been adjusted to innermore positions for a lesser rear tread width of vehicle 10, as is sometimes done for particular crop row spacings or other conditions of operation. An intermediate position of sway width adjustment is desirable for such operation in order to preclude the undesirable condition described above.

An adjustment of cam plate 32 to engagement with third aperture 47c causes surface 34c to engage cam follower 40. The thickness of cam plate 32 under surface 34c substantially equals the width of the gap between draft arms 26, 28 and first portion 22. The gap is substantially filled by cam plate 32 and no sway is thereby allowed, rendering hitch 20 and an implement mounted substantially thereon laterally rigid with respect to vehicle 10, a desirable condition for transport of all implement and for operation of some powered implements as well.

Adjustment of cam plate 32 to engagement with third aperture 47a causes cam follower 40 to abut surface 34a, which overlies the thinnest part of cam plate 32 and thereby provides the maximum sway width adjustment for hitch 20. This sway width is appropriate for most operations of vehicle 10 coupled to an implement by hitch 20 when rear moving devices 16, 18 of vehicle 10 are adjusted to outermore positions for a larger rear tread width of vehicle 10.

Adjustment of cam plate 32 to engagement with third aperture 47b causes cam follower 40 to abut surface 34b, which overlies a part of cam plate 32 having an intermediate thickness, and thereby provides a reduced sway width adjustment for hitch 20. This sway width is appropriate for use when rear moving devices 16, 18 are adjusted to their innermore positions for reduced rear tread width of vehicle 10 and hence are positioned nearer draft arms 26, 28.

While the embodiments illustrated in the FIG's. and described above are presently preferred, it should be understood that these embodiments are offered by way of example only. For additional example, positions of cam plates 32 and cam followers 40 may be reversed in that cam plates 32 may be mounted on draft arms 26, 28 and cam followers 40 may be mounted on first portion 22 of hitch 20. A hitch mechanism may be provided which has three points of engaging an implement and hence will fit existing implements intended for use with existing three-point hitches utilizing four-bar linkages having arcuate paths of motion, but may instead use a mechanism not including a four-bar linkage and not having an arcuate path of motion. Cam plate 32 may be configured as a slideable rectangle, or other parallelepiped, instead of as a rotary or pivotable device. A varying number of partial sway adjustment positions may be provided. Sway adjustability need not be symmetrical, but instead be biased to one side or the other to accommodate, e.g., an asymmetrical implement. Cam plates 32 need not pivot about first shafts 42 affixed to first portion 22 of hitch 20, but may instead be affixed to first shafts by, e.g., welding and the first shafts configured to be pivotable with respect to first portion 22. Furthermore, follower 40 may be configured to operate with cam plates 32 having continuous surfaces rather than the stepped surfaces 34a, 34b, and 34c. Similarly, other differences of construction rather than invention will be obvious to those skilled in the art. The invention is not intended to be limited to any particular embodiment, but is intended to extend to various modifications that nevertheless fall within the scope and spirit of the appended claims.

What is claimed is:

1. A work vehicle for carrying an implement and for traversing both on-road and off-road surfaces, the vehicle having a longitudinal center line, a left side and a right side, the vehicle comprising:
   a frame;
   a hitch mounted upon the frame for the coupling of an implement to the vehicle, the hitch configured to allow lateral movement, or sway, with respect to the frame; and
   moveable ground support devices disposed at each side of the vehicle and associated with the frame for elevating and supporting the frame with respect to the surface and for allowing traversing of the frame with respect to the surface; and
   an adjusting apparatus for adjustably limiting the width of the sway, the adjusting apparatus including:
      a first cam follower coupled to the hitch; and
      a first cam coupled to the frame, the first cam having a first full sway surface, at least one first partial sway surface and a first substantially no sway surface, wherein the first cam moves in a first plane substantially parallel to the longitudinal centerline of the vehicle between a full sway position in which the first full sway surface faces the first cam follower, a partial sway position in which the at least one first partial sway surface faces the first cam follower and a no sway position in which the first no sway surface faces the first cam follower.

2. The vehicle of claim 1 wherein the first cam pivots about an axis transverse to the first plane.

3. The vehicle of claim 1 wherein each of the first full sway surface, the at least one first partial sway surface and the first substantially no sway surface extends in an involute arc towards the axis.

4. The vehicle of claim 1 wherein the first cam is selectively and releasably securable in either the full sway position, the limited sway position or the no sway position.

5. The vehicle of claim 4 wherein one of the frame and the first cam includes at least one detent and the other of the frame and the first cam includes at least one detent engaging member configured to releasably retain the first cam in either the full sway position, the partial sway position or the no sway position.

6. The vehicle of claim 1 wherein the first full sway surface, the at least one first partial sway surface and the first substantially no sway surface are stepped relative to one another.

7. The vehicle of claim 1 wherein the first full sway surface, the at least one first partial sway surface and the first substantially no sway surface arcuately extend adjacent to one another.

8. The vehicle of claim 1 wherein the hitch pivots to move the first cam follower in an arc and wherein each of the surfaces smoothly and continuously extends along the arc when facing the first cam follower.

9. The vehicle of claim 1 wherein the hitch includes a left draft arm and a right draft arm;
   wherein the first cam and the first cam follower are coupled to the frame and the left draft arm, respectively; and
   wherein the adjusting apparatus includes:
      a second cam follower coupled to the right draft arm; and
      a second cam coupled to the frame, the second cam having a second full sway surface, at least one second partial sway surface and a second substantially no sway surface, wherein the second cam moves in a second plane substantially parallel to the longitudinal centerline of the vehicle between a full sway position in which the second full sway surface faces the second cam follower, a partial sway position in which the at least one second partial sway surface faces the second cam follower, and a no sway position in which the second no sway surface faces the second cam follower.

10. The vehicle of claim 1 wherein the first full sway surface, the at least one first partial sway surface and the first substantially no sway surface are spaced from the longitudinal centerline of the vehicle by first, second and third increasing distances, respectively, when facing the first cam follower.

11. The vehicle of claim 1 wherein the moveable ground support devices are repositionable relative to the longitudinal centerline of the vehicle.

12. A work vehicle for carrying an implement, the vehicle having a longitudinal centerline, a left side and a right side, the vehicle comprising:
   a frame;
   moveable ground support devices disposed at each side of the vehicle and associated with the frame for elevating and supporting the frame with respect to ground and allowing traversing of the frame with respect to the ground;
   a hitch including a left draft arm and a right draft arm pivotably coupled to the frame;
   a first cam follower coupled to the left draft arm;
   a first cam coupled to the frame, the first cam having at least three distinct continuous surface profiles configured to cooperate with the first cam follower to allow the hitch to sway by varying extents, wherein the first cam moves in a first plane substantially parallel to the longitudinal centerline of the vehicle to selectively reposition each of the distinct surface profiles opposite the first cam follower;

a second cam follower coupled to the right draft arm; and a second cam coupled to the frame, the second cam having at least three distinct surface profiles configured to cooperate with the second cam follower to allow the hitch to sway by varying extents, wherein the second cam moves in a second plane substantially parallel to the longitudinal centerline of the vehicle to selectively reposition each of the plurality of distinct surface profiles opposite the second cam follower.

13. The vehicle of claim 12 wherein the first cam pivots in the plane about an axis.

14. The vehicle of claim 13 wherein each of the at least three distinct surface profiles extends in an involute arc towards the axis.

15. The vehicle of claim 12 wherein the plurality of distinct surfaces of the first cam are stepped relative to one another.

16. The vehicle of claim 12 wherein the plurality of distinct surface profiles of the first cam arcuately extend adjacent to one another.

17. The vehicle of claim 12 wherein the left draft arm and the right draft arm pivot to move the first cam follower and the second cam follower, respectively, in an arc and wherein each of the plurality of distinct surface profiles of the first and second cams smoothly and continuously extends along the arc when facing the first and second cam followers, respectively.

18. The vehicle of claim 12 wherein the moveable ground support devices are repositionable relative to the longitudinal centerline of the vehicle.

19. A work vehicle for carrying an implement, the vehicle having a longitudinal centerline, a left side and a right side, the vehicle comprising:

a frame;

moveable ground support devices disposed at each side of the vehicle and associated with the frame for elevating and supporting the frame with respect to the ground;

a hitch including a left draft arm and a right draft arm pivotably coupled to the frame;

a first cam follower coupled to one of the frame and the left draft arm; and a first cam coupled to the other of the frame and the left draft arm, the first cam having at least three distinct continuous surface profiles spaced from the longitudinal centerline of the vehicle by varying distances, wherein the first cam moves in a plane non-perpendicular to the longitudinal centerline of the vehicle to selectively reposition each of the distinct surface profiles opposite the first cam follower to allow the left draft arm to sway by varying extents.

20. The vehicle of claim 19 including:

a second cam follower coupled to one of the frame and the right draft arm; and a second cam follower coupled to the other of the frame and the right draft arm, the second cam having at least three distinct surface profiles spaced from the longitudinal centerline of the vehicle by varying distances, wherein the second cam moves in a plane non-perpendicular to the longitudinal centerline of the vehicle to selectively reposition each of the plurality of distinct surface profiles opposite the second cam follower.

* * * * *